May 31, 1927.

C. CIESLAK 1,630,924

PASTRY CREAM FILLING DEVICE

Filed Jan. 2, 1926

INVENTOR.
Charles Cieslak
BY
ATTORNEY

Patented May 31, 1927.

1,630,924

UNITED STATES PATENT OFFICE.

CHARLES CIESLAK, OF MILWAUKEE, WISCONSIN.

PASTRY-CREAM FILLING DEVICE.

Application filed January 2, 1926. Serial No. 78,750.

This invention relates generally to devices used in filling cream puffs and the like, the invention having more particular reference to a novel type of cream puff filling device. The invention has for an object the provision of an improved device which will save time, and which is positive in action.

For further comprehension of the invention, and of the objects and advantages thereof, reference will be had to the following description and accompanying drawings, and to the appended claims in which the various novel features of the invention are more particularly set forth.

Figure 1:
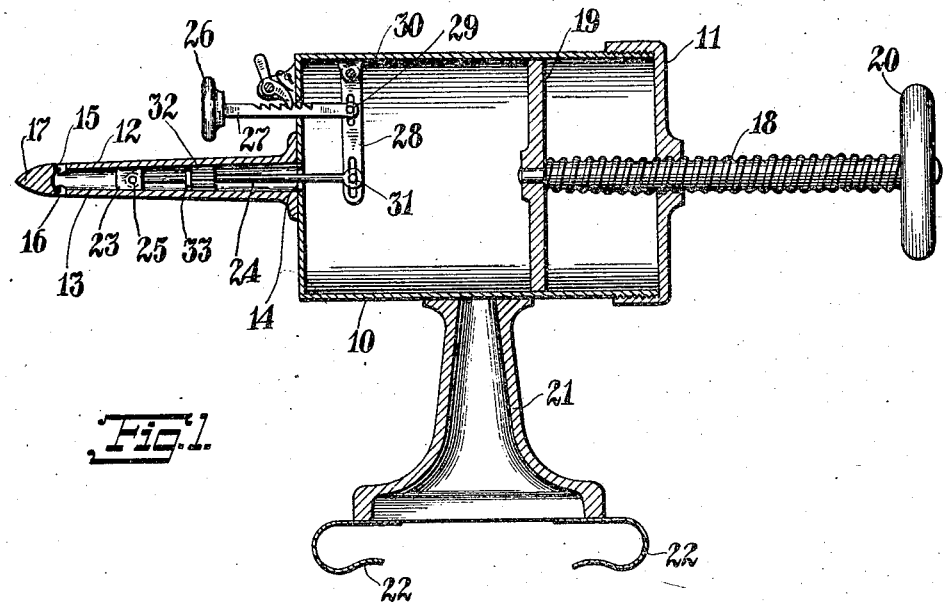

Fig. 1 of the drawing is a vertical central sectional view of my improved device.

Figures 2, 3:
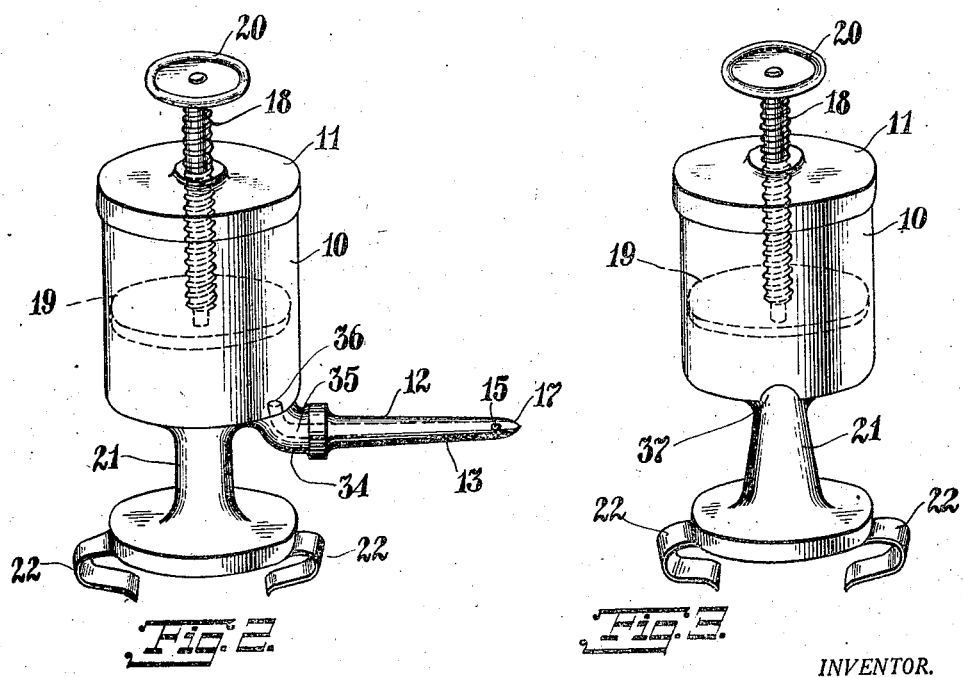

Fig. 2 of the drawing is a perspective view showing a modification thereto.

Fig. 3 of the drawing, is a similar view, but showing a further modification thereto.

As here embodied my improved device for filling cream puffs and the like comprises a hollow cylindrical container 10, and a cap 11, removably attached thereto, by screw threads or in any similar manner. The container 10 has suitably attached thereto, at its center, a protruding spout 12 having an axial tapered aperture 13 registering with an aperture 14 located in the center of the container 10, said axial tapered aperture 13 being intercommunicative with the two radial apertures 15 and 16 located at the base of the pointed extremity 17 of the protruding spout 12. The cap 11 is provided with a threaded aperture centrally located therein to accommodate the screw 18, which has attached at its inner extremity a disc 19 slidably fitting in the hollow cylindrical container 10. The screw 18 has attached at its outer extremity a hand wheel 20, or any similar suitable handle.

It is obvious from the foregoing description that I have provided a means of filling cream puffs and the like, and as a means of quickly shutting off the flow of paste through the axial tapered aperture 13, I have provided a tapered plug 23, attached to a rod 24 as at 25, which is operated by the button 26 attached to the stem 27 which is a slidable fit in the hollow cylindrical container 10, and has attached at its inner extremity a lever 28 as at 29, which has one extremity pivotally mounted on lug 30 protruding inwardly from the hollow cylindrical container 10, the other extremity of the lever 28 being pivotally and slidably coupled to the other extremity of the rod 24, as at 31.

As a means of agitating or mixing the paste or ingredients to be projected into the cream puffs, and to prevent lumps from forming therein, which would block the axial tapered aperture 13, I have provided a cylindrical member 32 having longitudinally cut grooves on its periphery, the cylindrical member 32 being rotatably mounted on the rod 24, which has a bushing or collar 33, to hold the cylindrical member 32 in a fixed relative position.

It will be understood that the hollow cylindrical container 10 is horizontally disposed, and has attached thereto a suitable standard or base 21, with depending clips 22 or any suitable fastening means, to permit of holding my improved device on a table or bench.

Referring in particular to Figure 2 of the accompanying drawing, showing a modification of my improved device. The hollow cylindrical container 10 is vertically disposed, and the protruding spout 12 is horizontal, or at right angles thereto, and is attached to the hollow cylindrical container 10 by means of a right angled elbow coupling 34 having an aperture 35 to register with the axial tapered aperture 13, and a second aperture 36 at right angles to the said aperture 35, intercommunicative therewith and with the hollow cylindrical container 10.

It will be understood that the modification of my improved device as shown in Figure 2, is especially adapted to handle thinner paste, and is therefore not provided with the agitating device as heretobefore described. It will be further understood that the shut off device, heretofore referred to is also not provided, as the cream puffs to be filled may be more rapidly handled and filled, owing to the thin paste used, and it is therefore not necessary or advisable to shut off the flow of paste.

Referring in particular to Figure 3 of the accompanying drawing showing a further modification of my improved device. The hollow cylindrical container 10 is vertically disposed, and is provided with a notched aperture 37, located at its lower extremity. It being understood that this particular type of device is not provided with an agitator or shut off, inasmuch as a thin paste is likewise used. It will be also understood that the cream puffs to be filled by this particular device, have a portion cut therefrom, which will permit the paste to be placed therein without the necessity of puncturing the cream puff, for this reason the protruding spout, as heretobefore described, is not provided.

While I have above described the preferred form, and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new, and desire to protect by Letters Patent of the United States is as follows:—

1. A device of the class described used for filling cream puffs, comprising a container and a conical spout, having radial outlets, projecting axially therefrom, means in the container for ejecting the cream into the puff, a conical valve fitting within the spout for controlling the flow of cream, means for adjusting the valve, and means for agitating the cream to prevent caking before passing through the valve.

2. A device of the class described used for filling cream puffs, comprising an enclosed container and a conical spout projecting axially therefrom, a piston within the cylinder for ejecting the cream into the puff, a rod screw-threaded axially in the cover of the container and having a hand wheel for moving the piston, a conical valve fitting within the spout for controlling the flow of the cream, means for regulating the valve opening, and means within the spout for preventing clogging or caking of the cream before passing through the valve.

In testimony whereof I have affixed my signature.

CHARLES CIESLAK.